United States Patent
Prasad

(10) Patent No.: US 10,279,786 B2
(45) Date of Patent: May 7, 2019

(54) AUTOMATIC BRAKING SYSTEM

(71) Applicant: Aptiv Technologies Limited, St. Michael (BB)

(72) Inventor: Premchand Krishna Prasad, Carmel, IN (US)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 15/369,980

(22) Filed: Dec. 6, 2016

(65) Prior Publication Data

US 2018/0154871 A1   Jun. 7, 2018

(51) Int. Cl.
  *B60T 7/22*   (2006.01)
  *G08G 1/16*   (2006.01)
  *G01S 13/93*  (2006.01)

(52) U.S. Cl.
  CPC .............. *B60T 7/22* (2013.01); *G01S 13/931* (2013.01); *G08G 1/16* (2013.01); *B60T 2201/022* (2013.01); *B60T 2201/081* (2013.01); *B60T 2201/083* (2013.01); *B60T 2201/089* (2013.01); *B60T 2210/36* (2013.01); *B60T 2270/60* (2013.01); *G01S 2013/9346* (2013.01)

(58) Field of Classification Search
None
See application file for complete search history.

(56) References Cited

U.S. PATENT DOCUMENTS

| | | | | |
|---|---|---|---|---|
| 6,583,403 B1* | 6/2003 | Koike | ............... | G01S 13/931 250/221 |
| 2004/0061598 A1* | 4/2004 | King | ............... | B60R 21/013 340/435 |
| 2007/0100527 A1* | 5/2007 | Rao | ............... | B60R 19/483 701/45 |
| 2007/0228705 A1* | 10/2007 | Rao | ............... | B60R 21/0134 280/735 |
| 2010/0100268 A1* | 4/2010 | Zhang | ............... | B60W 30/09 701/25 |
| 2010/0220189 A1* | 9/2010 | Yanagi | ............... | B60R 1/00 348/148 |
| 2012/0069182 A1* | 3/2012 | Sumi | ............... | B60R 1/00 348/148 |
| 2012/0326917 A1* | 12/2012 | Kiehne | ............... | B60T 7/22 342/71 |

(Continued)

*Primary Examiner* — Rami Khatib
(74) *Attorney, Agent, or Firm* — Joseph V. Banadies

(57) ABSTRACT

A braking-system suitable for use on an automated vehicle includes a ranging-sensor, a braking-actuator and a controller in communication with the ranging-sensor and the braking-actuator. The ranging-sensor is used to detect an object proximate to a host-vehicle when the object resides in a field-of-view of the ranging-sensor. The field-of-view defines a bottom-edge of the field-of-view and a boundary of a conflict-zone, where the boundary corresponds to a portion of the bottom-edge. The a braking-actuator used to control movement of the host-vehicle. The controller determines a height of the object, determines a distance to the object, determines a range-rate of the object when the object is in the field-of-view, and activates the braking-actuator when an estimated-distance to the object is less than a distance-threshold, the height of the object is greater than a height-threshold, and the object has crossed the boundary and thereby enters the conflict-zone.

4 Claims, 3 Drawing Sheets

(56) References Cited

U.S. PATENT DOCUMENTS

| | | | |
|---|---|---|---|
| 2013/0028053 A1* | 1/2013 | Tsuji | G01S 7/521 |
| | | | 367/93 |
| 2013/0093583 A1* | 4/2013 | Shapiro | G01S 15/931 |
| | | | 340/436 |
| 2013/0261916 A1* | 10/2013 | Sekiguchi | B60T 7/22 |
| | | | 701/70 |
| 2014/0168415 A1* | 6/2014 | Ihlenburg | B60R 11/04 |
| | | | 348/118 |
| 2015/0234045 A1* | 8/2015 | Rosenblum | G01S 13/931 |
| | | | 342/71 |
| 2016/0119587 A1* | 4/2016 | Tan | B60R 1/00 |
| | | | 348/148 |
| 2017/0162056 A1* | 6/2017 | Feyerabend | B60Q 9/008 |
| 2017/0356994 A1* | 12/2017 | Wodrich | G01S 13/931 |
| 2018/0039283 A1* | 2/2018 | Srivastava | B60W 40/13 |

\* cited by examiner

AUTOMATIC BRAKING SYSTEM

TECHNICAL FIELD OF INVENTION

This disclosure generally relates to a braking-system suitable for use on an automated vehicle, and more particularly relates to a braking-system that tracks an object.

BACKGROUND OF INVENTION

It is known to automatically activate a braking-system on a vehicle to prevent a collision with another vehicle or an object. Vehicles may erroneously activate the braking-system when the object is detected who's size may not warrant braking.

SUMMARY OF THE INVENTION

In accordance with one embodiment, a braking-system suitable for use on an automated vehicle is provided. The braking-system includes a ranging-sensor, a braking-actuator and a controller in communication with the ranging-sensor and the braking-actuator. The ranging-sensor is used to detect an object proximate to a host-vehicle when the object resides in a field-of-view of the ranging-sensor. The field-of-view defines a bottom-edge of the field-of-view and a boundary of a conflict-zone, where the boundary corresponds to a portion of the bottom-edge. The braking-actuator is used to control movement of the host-vehicle. The controller determines a height of the object, determines a distance to the object, determines a range-rate of the object when the object is in the field-of-view, and activates the braking-actuator when an estimated-distance to the object is less than a distance-threshold, the height of the object is greater than a height-threshold, and the object has crossed the boundary and thereby enters the conflict-zone.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
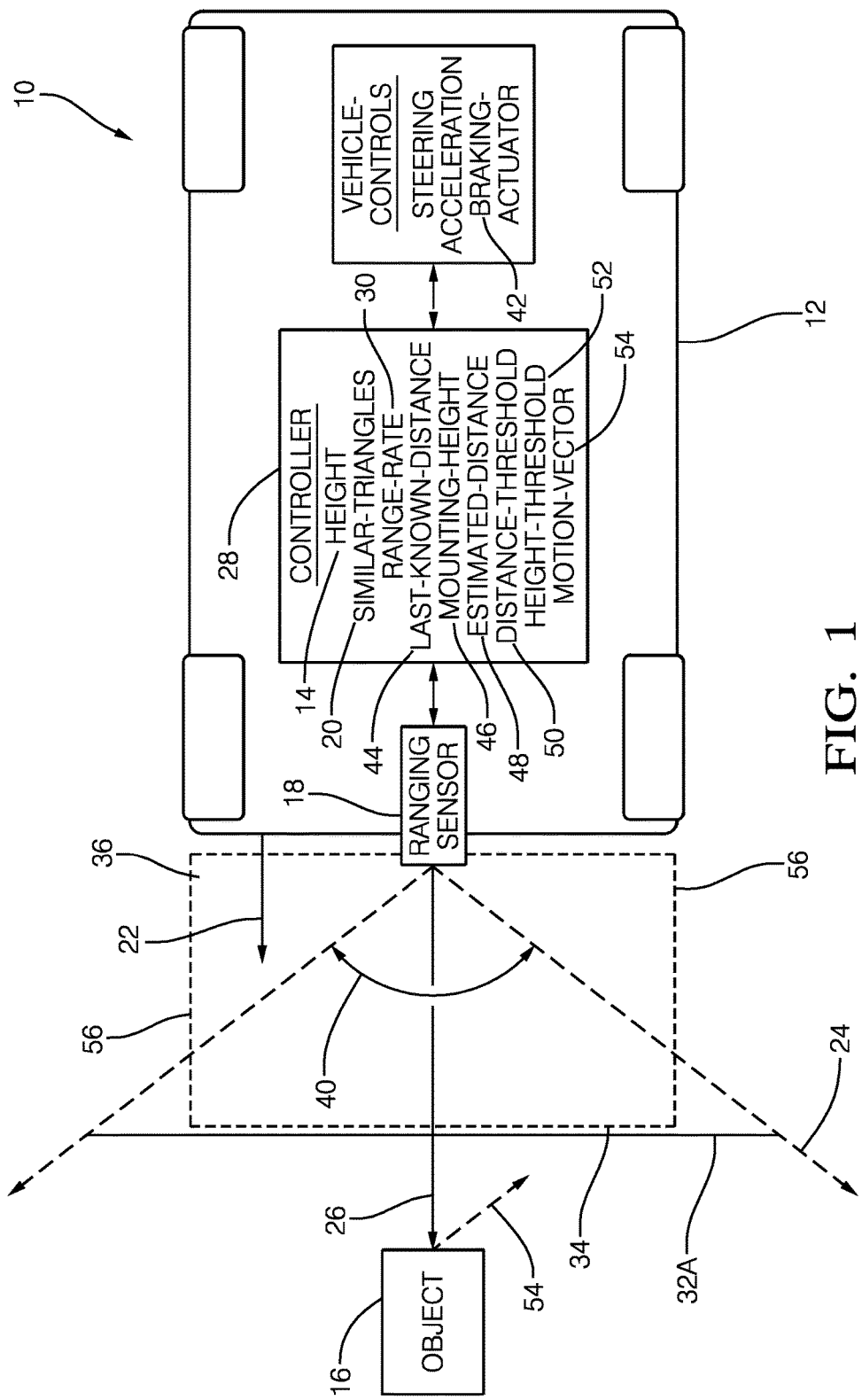
FIG. 1 is a top-view of a host-vehicle equipped with a braking-system in accordance with one embodiment.

FIG. 1 illustrates a non-limiting example of a braking-system 10, hereafter referred to as the system 10, which is suitable for use on an automated vehicle, for example a host-vehicle 12. As will be described in more detail below, the system 10 is an improvement over prior braking-systems because the system 10 is configured to more accurately determine a height 14 of an object 16 using a ranging-sensor 18 and a property of similar-triangles 20, and control movement 22 of the host-vehicle 12 based on the height 14. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing a lane-keep-assist (LKA) or a lane-centering (LC) to the human, and possibly operating the brakes of the host-vehicle 12 to prevent the host-vehicle 12 from entering a travel-path of an approaching vehicle.

The system 10 includes the ranging-sensor 18 that is used to detect the object 16 proximate to the host-vehicle 12 when the object 16 resides in a field-of-view 24 of the ranging-sensor 18. The ranging-sensor 18 may be a radar-sensor, a lidar-sensor, or an ultrasonic-sensor. Typically, radar-systems on vehicles are capable of only determining a range 26 and azimuth-angle (not shown) to a target so may be referred to as a two-dimensional (2D) radar-system. Other radar-systems are capable of determining an elevation-angle to a target so may be referred to as a three-dimensional (3D) radar-system. In the non-limiting example illustrated in FIG. 1, the ranging-sensor 18 is a 2D radar-sensor. A radar-sensor-system with a similarly configured radar-sensor is available from Delphi Inc. of Troy, Mich., USA and marketed as an Electronically Scanning Radar (ESR) or a Rear-Side-Detection-System (RSDS). It is contemplated that the teachings presented herein are applicable to both 2D radar-systems and 3-D radar-systems with one or more sensor devices, i.e. multiple instances of the radar-sensor. The radar-sensor is generally configured to detect a radar-signal (not shown) that may include data indicative of a detected-target proximate to the host-vehicle 12. As used herein, the detected-target may be the object 16 that is detected by the radar-sensor and tracked by a controller 28, as will be described below.

By way of example and not limitation, the radar-sensor may be configured to output a continuous or periodic data stream that includes a variety of signal characteristics associated with each target detected. The signal characteristics may include or be indicative of, but are not limited to, the range 26 to the target from the host-vehicle 12, the azimuth-angle to the target relative to a host-vehicle-longitudinal-axis (not shown), an amplitude (not shown) of the radar-signal, and a relative-velocity of closure (i.e. a range-rate 30) relative to the target.

Figure 2:
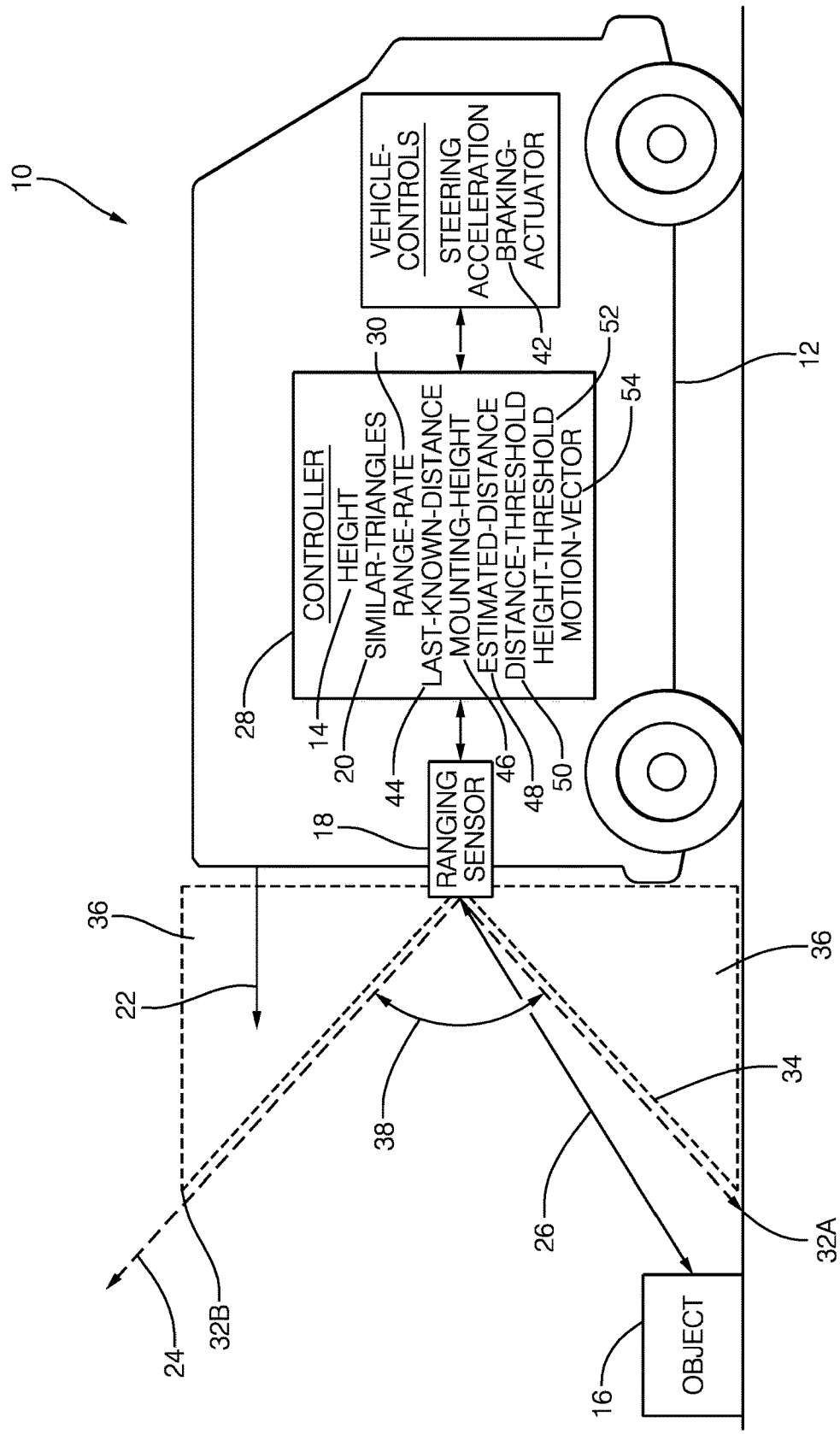
FIG. 2 is a side-view of the host-vehicle of FIG. 1 equipped with a braking-system in accordance with one embodiment.

As described herein the ranging-sensor 18 is a 2D radar-sensor, and the field-of-view 24 may define an edge 32A of the field-of-view 24 and a boundary 34 of a conflict-zone 36, where the boundary 34 corresponds to a portion of the edge 32A of the field-of-view 24 (FIGS. 1 & 2). The edge 32A defines a line where the radar-signal impinges on the ground. The boundary 34 of the conflict-zone 36 on both a left-side and a right-side of the host-vehicle 12 extends from each corner of the host-vehicle 12. The object 16 in the conflict-zone 36 and the host-vehicle 12 will collide if the host-vehicle 12 continues to move in the direction of the object 16. The field-of-view 24 also has a known vertical-angle 38 and a known horizontal-angle 40 that are design features of the ranging-sensor 18 and determine how close to the host-vehicle 12 the object 16 on the ground may be detected.

If the ranging-sensor 18 is a 3D device, the field-of-view 24 of the ranging-sensor 18 may define both the edge 32A and a top-edge 32B of the field-of-view 24 (FIG. 2). In this case the boundary 34 of the conflict-zone 36 may also exist above the ranging-sensor 18 where the top-edge 32B defines a line where the field-of-view 24 of the ranging-sensor 18 may intersect with a horizontal-projection of a top of the host-vehicle 12. If the object 16 resides in the conflict-zone 36 above the ranging-sensor 18 (a tree branch or a cantilevered-member, for example), the host-vehicle 12 will collide with the object 16 if the host-vehicle 12 continues to move in the direction of the object 16.

The system 10 also includes a braking-actuator 42 that is used to control movement 22 of the host-vehicle 12. Movement 22 may be defined as forward-movement and/or rearward-movement of the host-vehicle 12. In the non-limiting examples illustrated in FIGS. 1-3 the movement 22 is rearward-movement, that is, the host-vehicle 12 is performing a backing-maneuver. The braking-actuator 42 may be installed on each wheel of the host-vehicle 12 and may be a friction-device. The braking-actuator 42 may also be an electric-motor that may utilize regenerative-braking that may exist on hybrid-electric-vehicles or electric-vehicles, as will be understood by one skilled in the art.

The system 10 also includes the controller 28 in communication with the ranging-sensor 18 and the braking-actuator 42. The controller 28 may include a processor (not specifically shown) such as a microprocessor or other control circuitry such as analog and/or digital control circuitry including an application specific integrated circuit (ASIC) for processing data as should be evident to those in the art. The controller 28 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 16 is going to be in the intended path of the host-vehicle 12 based on signals received by the controller 28 from the ranging-sensor 18 as described herein.

The controller 28 may analyze the radar-signal to categorize the data from each detected-target with respect to a list of previously detected-targets having established tracks. As used herein, a track refers to one or more data sets that have been associated with a particular one of the detected-targets. By way of example and not limitation, if the amplitude of the radar-signal is above a predetermined amplitude threshold, then the controller 28 determines if the data corresponds to a previously detected-target or if a new-target has been detected. If the data corresponds to a previously detected-target, the data is added to or combined with prior data to update the track of the previously detected-target. If the data does not correspond to any previously detected-target because, for example, it is located too far away from any previously detected-target, then it may be characterized as a new-target and assigned a unique track identification number. The identification number may be assigned according to the order that data for a new detected-target is received, or may be assigned an identification number according to a grid location in the field-of-view 24.

Figure 3:
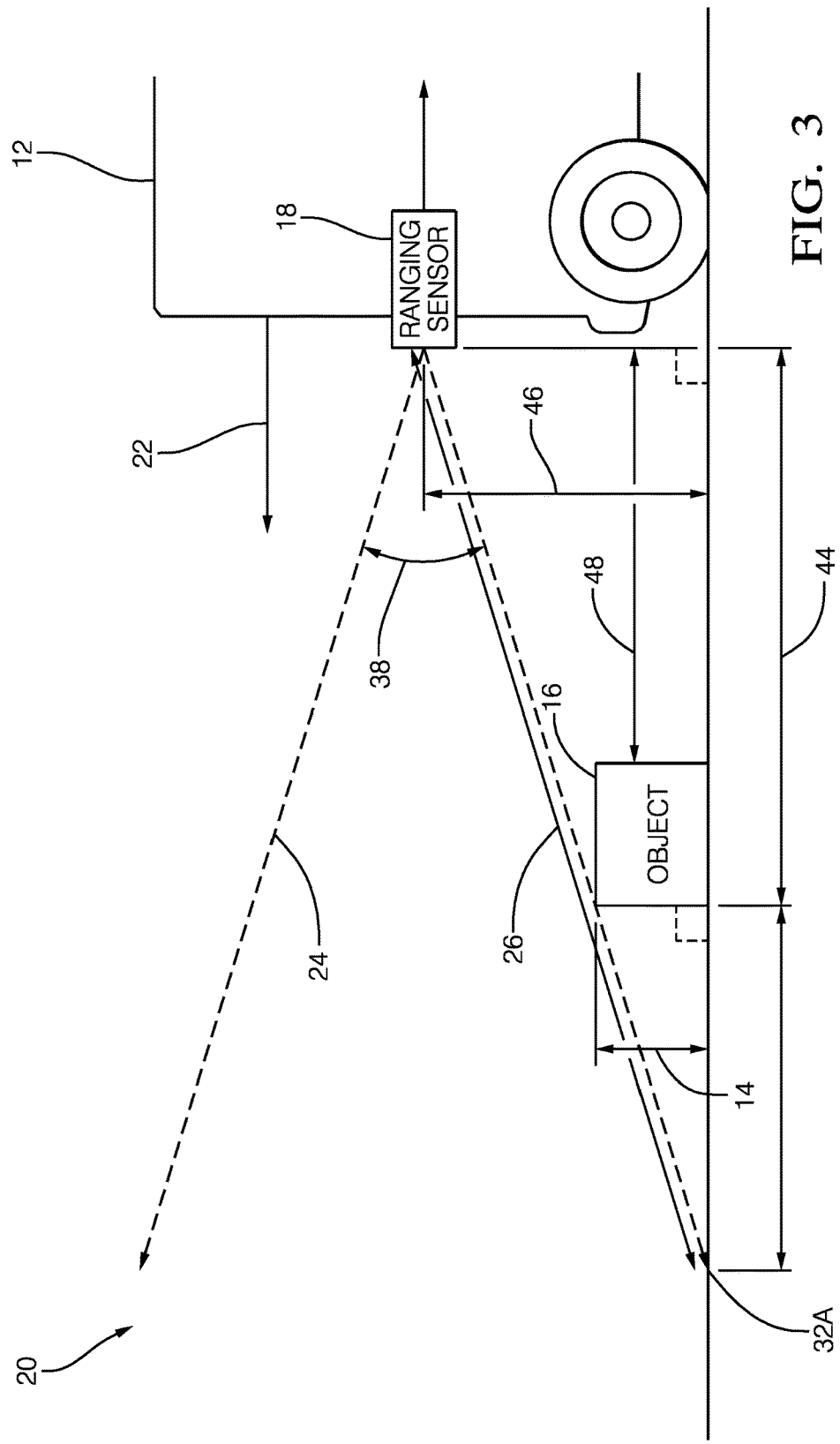
FIG. 3 is a side-view of the host-vehicle of FIG. 1 equipped with a braking-system in accordance with one embodiment.

The controller 28 is further configured to determine the height 14 of the object 16 when the object 16 is in the field-of-view 24 of the radar-sensor. The controller 28 may use a property of similar-triangles 20 to determine the height 14 as shown in FIG. 3. FIG. 3 illustrates the host-vehicle 12 moving toward the object 16 where the edge 32A of the field-of-view 24 has just moved beyond the object 16. As discussed previously, the controller 28 may track the object 16, and a length (not shown) and a width (not shown) of the object 16 may be determined based on the radar-signal from the 2D radar-sensor, as will be understood by one skilled in the art of radar-systems. The controller 28 may identify a last-known-distance 44 at a moment in time when the object 16 is no longer detected in the field-of-view 24. Because a mounting-height 46 of the ranging-sensor 18 on the host-vehicle 12 is known, and a point at which the radar-signal impinges on the ground (not specifically shown) is known, the property of similar-triangles 20 may be used by the controller 28 to determine the height 14 of the object 16, as will be understood by one skilled in the art of geometry.

The controller 28 may also determine an estimated-distance 48 from the host-vehicle 12 to the object 16 based on the last-known-distance 44 and the range-rate 30 determined when the object 16 crossed the boundary 34. By combining the last-known-distance 44 with the known length of the object 16, the estimated-distance 48 may be determined and may be updated in the controller 28 based on a velocity (not shown) of the host-vehicle 12, as will be understood by one skilled in the art. The controller 28 may also determine the estimated-distance 48 by tracking the range 26 to an other-target (not shown) in the field-of-view 24 after the object 16 has exited the field-of-view 24, and update the estimated-distance 48 as the host-vehicle 12 moves relative to the other-target. The controller 28 may also determine the estimated-distance 48 by counting pulses from a wheel-sensor (not shown) after the object 16 has exited the field-of-view 24, and update the estimated-distance 48 based on the number of pulses and a direction of wheel-rotation (not shown). The controller 28 may also determine the estimated-distance 48 by based on a Global Positioning System (GPS) signal (not shown) after the object 16 has exited the field-of-view 24, and update the estimated-distance 48 based on the global-position of the host-vehicle 12.

The controller 28 may activate the braking-actuator 42 when the estimated-distance 48 to the object 16 is less than a distance-threshold 50, the height 14 is greater than a height-threshold 52, and the object 16 has crossed the boundary 34 and enters the conflict-zone 36. The distance-threshold 50 may be any user-defined length within the conflict-zone 36 and may be zero meters, representing the object 16 is located at a vertical-projection of a bumper (not shown) of the host-vehicle 12. The height-threshold 52 may be any user-defined height 14 that may exceed a ground-clearance (not specifically shown) of the host-vehicle 12, and may be greater than 150 millimeters, for example.

The controller 28 may further characterize the object 16 by a motion-vector 54 (FIG. 1) that is used to determine when the object 16 is moving and will exit a side 56 of the conflict-zone 36. The controller 28 may not activate the braking-actuator 42 when the object 16 is moving and is determined to exit the side 56 of the conflict-zone 36, no longer residing in the travel-path of the host-vehicle 12. The motion-vector 54 may have a magnitude and a direction and may be based on the data contained in the radar-signal while the object 16 is in the field-of-view 24, as described previously.

Accordingly, a braking-system 10, and a controller 28 for the braking-system 10 is provided. The system 10 is an improvement over prior braking-systems because the system 10 is configured to more accurately determine the height 14 of the object 16 using the ranging-sensor 18 and the property of similar-triangles 20, and control the movement 22 of the host-vehicle 12 based on the height 14.

While this invention has been described in terms of the preferred embodiments thereof, it is not intended to be so limited, but rather only to the extent set forth in the claims that follow. Moreover, the use of the terms first, second, upper, lower, etc. does not denote any order of importance, location, or orientation, but rather the terms first, second, etc. are used to distinguish one element from another. Further-more, the use of the terms a, an, etc. do not denote a limitation of quantity, but rather denote the presence of at least one of the referenced items.

I claim:

1. A braking-system suitable for use on an automated vehicle, said system comprising:

a ranging-sensor used to detect an object proximate to a host-vehicle when the object resides in a field-of-view of the ranging-sensor, wherein the field-of-view defines an edge of the field-of-view and a boundary of a conflict-zone, whereby the object in the conflict-zone and the host-vehicle will collide as the host-vehicle moves toward the object, said boundary extending from a left-side and a right-side of the host-vehicle and terminating at the edge of the field-of-view, said boundary corresponding to a portion of the edge, said edge defining a line where a ranging-sensor-signal impinges on the ground such that the object in the conflict-zone is not detected by the ranging-sensor;

a braking-actuator used to control movement of the host-vehicle; and a controller in communication with the ranging-sensor and the braking-actuator, wherein the controller determines a height of the object, determines a distance to the object, determines a range-rate of the object when the object is in the field-of-view, and activates the braking-actuator when an estimated-distance to the object is less than a distance-threshold, the height of the object is greater than a height-threshold, and the object has crossed the boundary and thereby enters the conflict-zone;

wherein while the host-vehicle is moving the controller determines the estimated-distance to the object based on both a last-known-distance and the range-rate determined when the object crossed the boundary into the conflict-zone and is thereby undetected by the ranging-sensor.

2. The system in accordance with claim 1, wherein the controller determines the height of the object based on a similar-triangle property.

3. The system in accordance with claim 1, wherein the ranging-sensor is a two-dimensional radar-sensor.

4. The system in accordance with claim 1, wherein the object is characterized by a motion-vector, said motion-vector used to determine when the object will exit a side of the conflict-zone, and the braking-actuator is not activated when the object is moving and exits the side of the conflict-zone.

* * * * *